United States Patent [19]

Shuman et al.

[11] Patent Number: 5,567,753

[45] Date of Patent: Oct. 22, 1996

[54] ADHESIVE COMPOSITION WHICH CHANGES FROM COLORED TO COLORLESS UPON APPLICATION TO A SUBSTRATE

[75] Inventors: Ralph J. Shuman, Needham; Barbara J. Burns, Auburn, both of Mass.

[73] Assignee: Avery Dennison Corporation, Pasadena, Calif.

[21] Appl. No.: 380,096

[22] Filed: Jan. 27, 1995

[51] Int. Cl.$^6$ .............................. C08K 5/17; C08K 5/098; C08K 5/13; C08L 39/06
[52] U.S. Cl. ........................ 524/249; 524/247; 524/291; 524/394; 524/548
[58] Field of Search .................................. 524/247, 248, 524/249, 250, 291, 394, 548

[56] References Cited

U.S. PATENT DOCUMENTS

| Re. 30,747 | 9/1981 | Muszik et al. | 524/394 |
|---|---|---|---|
| 3,576,776 | 4/1971 | Muszik et al. | 524/238 |
| 3,617,325 | 11/1971 | Spokes et al. | 427/145 |
| 3,817,887 | 6/1974 | Mestetsky | 524/394 |
| 4,162,164 | 7/1979 | Lin | 106/21 R |
| 4,171,982 | 10/1979 | Lin | 106/21 A |
| 4,188,431 | 2/1980 | Sokol et al. | 106/21 A |
| 4,198,445 | 4/1980 | Sokol et al. | 427/140 |
| 4,441,928 | 4/1984 | Iijima | 106/21 A |
| 4,954,544 | 9/1990 | Chandaria | 524/111 |
| 5,196,243 | 3/1993 | Kawashima | 427/145 |
| 5,371,131 | 12/1994 | Gierenz et al. | 524/394 |
| 5,409,977 | 4/1995 | Sitaramiah et al. | 524/247 |

FOREIGN PATENT DOCUMENTS 1061943  3/1967  United Kingdom .

*Primary Examiner*—Peter A. Szekely
*Attorney, Agent, or Firm*—Kriegsman & Kriegsman

[57] ABSTRACT

An adhesive composition which undergoes a change from colored to colorless upon application to a substrate. The composition comprises a shape-giving base, the shape-giving base comprising a gel of a gel-forming salt of an aliphatic carboxylic acid having from about 8 to 36 carbon atoms with a cation selected from the group consisting of alkali metals, ammonia and lower alkylamines in an aqueous liquid selected from the group consisting of water and mixtures of water with water-miscible organic solvents. In a preferred embodiment, the aforementioned gel-forming salt of an aliphatic carboxylic acid is sodium stearate. The composition additionally includes an adhesive component selected from the group consisting of water-soluble and water dispersible adhesives. In a preferred embodiment, the adhesive component is polyvinylpyrrolidone. The composition further includes triethanolamine and a colored indicator which upon exposure to air becomes colorless, the colored indicator being a phthalein, such as phenolphthalein. The adhesive composition is preferably in stick-form disposed in an applicator, such as a reclosable tube dispenser.

20 Claims, No Drawings

ADHESIVE COMPOSITION WHICH CHANGES FROM COLORED TO COLORLESS UPON APPLICATION TO A SUBSTRATE

BACKGROUND OF THE INVENTION

The present invention relates generally to adhesive compositions and more particularly to adhesive compositions of the type which undergo a change from colored to colorless upon application to a substrate.

Adhesive compositions of the type which are in a rigid stick-form, which are slidably mounted in a reclosable dispensing tube and which deposit a tacky film when rubbed onto a receiving substrate are well-known. An example of such an adhesive composition is described in U.S. Pat. No. 3,576,776, inventors Muszik et al., which issued Apr. 27, 1971 and which is incorporated herein by reference. The adhesive composition of the aforementioned patent comprises a shape-giving base consisting of a gel of a gel-forming salt of an aliphatic carboxylic acid having from 8 to 36 carbon atoms with a cation selected from the group consisting of alkali metals, ammonia, and lower alkylamines. The adhesive composition also comprises a liquid selected from the group consisting of water, water-miscible organic solvents and mixtures thereof, and further comprises an amount of an adhesive component selected from the group consisting of water-soluble and water-dispersible adhesives. As described in the foregoing patent, a preferred example of the gel-forming salt is sodium stearate, and a preferred example of the water-soluble or water-dispersible adhesive is polyvinylpyrrolidone (PVP).

Adhesive sticks of the type described above suffer from the problem that they are colorless, thus making it difficult for a user to identify where the adhesive has been applied on a substrate. While the incorporation of a color dye or pigment into the adhesive composition would aid in identifying those areas coated, the presence of such colors in the adhesive would markedly limit the use of such adhesives since the color would remain visible, in many instances, if white or light colored substrates are adhered therewith.

One approach to the above-identified problem has been to include a colored indicator in the adhesive composition which, upon being applied to a substrate, undergoes a change in color from colored to colorless. Accordingly, immediately after applying the adhesive composition to a substrate, a user can identify where the adhesive has been applied based on its color; however, shortly thereafter, the adhesive dries colorless. Examples of the indicator include phthaleins, such as phenolphthalein and its alkyl derivatives. An adhesive composition of the type described above is disclosed in U.S. Pat. No. 4,954,544, inventor Chandaria, which issued Sep. 4, 1990 and which is incorporated herein by reference. Another adhesive composition of the type described above was sold by the present assignee, Avery Dennison Corporation, under the trademark AVERY® Disappearing Color Glue Stic. The AVERY® Disappearing Color Glue Stic adhesive composition included a base of sodium stearate in water, PVP, phenolphthalein, propylene glycol, polyethylene oxide and a plurality of antimicrobial agents.

One problem that was recognized with the aforementioned AVERY® adhesive composition was that, after being stored for a period of time, when the adhesive composition was applied to a substrate, it would not dry colorless, but instead, would dry to a brown color. As can readily be appreciated, this result was highly undesirable from a cosmetic point of view. Another problem that was recognized with the abovementioned adhesive composition was that, after being stored for a period of time, the adhesive composition, even before being applied to a substrate, often would lose the fullness of its color and, instead, would turn a more pale color.

SUMMARY OF THE INVENTION

It is an object of the present invention to provide a novel adhesive composition.

It is another object of the present invention to provide a novel adhesive composition of the type that changes from a colored state to a colorless state after being applied to a substrate.

It is still another object of the present invention to provide an adhesive composition as described above that overcomes at least some of the problems noted above in connection with certain existing adhesive compositions of the type that change from colored to colorless after being applied to a substrate.

It is still yet another object of the present invention to provide an adhesive composition as described above that is capable of being formed into a rigid stick and that is capable of being slidably mounted in and dispensed from a reclosable dispensing tube.

It is still yet a further object of the present invention to provide an adhesive composition as described above that is not toxic and that does not emit a noxious odor.

Additional objects, as well as features and advantages, of the present invention will be set forth in part in the description which follows, and in part will be obvious from the description or may be learned by practice of the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

In furtherance of the above and other objects to be described in or apparent from the description below, an adhesive composition which undergoes a change from colored to colorless upon application to a substrate is hereinafter provided, said adhesive composition comprising (a) a shape-giving base, (b) an adhesive component, (c) an indicator which changes from colored to colorless when exposed to air, and (d) triethanolamine or a similarly suitable aminoalcohol.

Preferably, the shape-giving base comprises a gel of a gel-forming salt of an aliphatic carboxylic acid having from about 8 to 36 carbon atoms with a cation selected from the group consisting of alkali metals, ammonia and lower alkylamines in an aqueous liquid selected from the group consisting of water and mixtures of water with water-miscible organic solvents. The adhesive component is preferably selected from the group consisting of water-soluble and water dispersible adhesives. The indicator is preferably a phthalein.

Preferably, the adhesive composition is prepared in stick-form and is contained within a reclosable tube dispenser. The composition preferably comprises approximately 2%–30% by weight of the gel-forming salt, approximately 25%–80% by weight of water, approximately 5%–40% by weight of the adhesive component, approximately 0.1%–2.5%, more preferably approximately 0.1%–0.25%, by weight of the colored indicator and approximately 5%–20%, more preferably approximately 5%–12%, by weight of triethanolamine. The gel-forming salt of an aliphatic carboxylic acid is preferably sodium stearate, the adhesive component is preferably polyvinylpyrrolidone, and the colored indicator is preferably phenolphthalein. The adhesive composition preferably additionally includes a lubricant and one or more antimicrobial agents, and may also include one or more additional colorants, e.g., phthaleins other than phenolphthalein, for adjusting the color of the adhesive composition.

DETAILED DESCRIPTION OF PREFERRED EMBODIMENTS

The present invention is premised on the discovery that the problems of non-transparent (i.e., brown) drying and loss of color which are noted above in connection with the above-described prior art AVERY® adhesive composition can be solved by incorporating triethanolamine or a similarly suitable aminoalcohol, instead of propylene glycol (or glycerine), into the adhesive composition.

Accordingly, although described below in greater detail, an adhesive composition prepared in accordance with the teachings of the present invention broadly comprises (a) a shape-giving base, (b) an adhesive component, (c) an indicator which changes from colored to colorless when exposed to air, and (d) triethanolamine or a similarly suitable aminoalcohol.

The shape-giving base of the present adhesive composition preferably comprises a gel of a gel-forming salt of an aliphatic carboxylic acid having from about 8 to 36 carbon atoms with a cation selected from the group consisting of alkali metals, ammonia and lower alkylamines in an aqueous liquid selected from the group consisting of water and mixtures of water with water-miscible organic solvents. The aforementioned aliphatic carboxylic acids may be either branched or straight chain and may contain double bonds or single substituents, such as chloro or bromo. Preferably, the aliphatic carboxylic acids should be alkanoic acids, alkenoic acids, alkadienoic acids and their monohalogen substituted acids, and particularly, fatty acids with 12 to 22 carbon atoms. Sodium stearate is a preferred gel-forming salt. It is to be understood that either a single species or a combination of species selected from the above-identified group of gel-forming salts may be used as the gel-forming salt. Preferably, the composition includes approximately 2%–30% by weight of the gel-forming salt and approximately 25%–80% by weight of water. Too little of the gel-forming salt may make the composition too soft, while too much may make the composition too hard.

The adhesive component of the present invention preferably comprises one or more adhesives selected from the group consisting of water-soluble and water dispersible adhesives. Polyvinylpyrrolidone (PVP) is a preferred adhesive, with PVP K 30 (having a molecular weight of approximately 200,000 daltons)(commercially available from ISP Corp., Wayne, N.J.) and PVP K90 (having species of PVP (which may be used individually or in combination). Preferably, the composition includes approximately 5%–40% by weight of the adhesive component.

The colored indicator of the present invention is preferably a phthalein, more preferably phenolphthalein. The phthalein is preferably in the form of a salt, such as sodium salt generated by reacting the phthalein with sodium hydroxide, so as to permit its solubilization into the present composition. Accordingly, for purposes of the present specification and claims, unless otherwise indicated or apparent, references to "phthaleins" are intended to refer either to the hydroxy or salt forms thereof. Preferably, the composition includes approximately 0.1–2.5%, more preferably 0.1%–0.25%, by weight of the colored indicator.

The aminoalcohol of the present invention is preferably triethanolamine (TEA). TEA is preferred because, in addition to solving the above-noted problems of non-transparent (i.e., brown) drying and loss of color, TEA is non-toxic and does not emit a noxious odor. By contrast, virtually all other aminoalcohols are toxic and/or emit a noxious odor. Preferably, TEA constitutes about 5%–20% (more preferably about 5%–12%) by weight of the present composition. In the Examples below TEA constitutes approximately 10.25% by weight of the total compositions.

Preferably, the present composition additionally includes a lubricant and one or more antimicrobial agents, and may also include one or more additional colorants, e.g., phthaleins other than phenolphthalein, for adjusting the color of the adhesive composition.

The following examples are illustrative only and should in no way limit the scope of the present invention:

EXAMPLE 1

An adhesive composition in accordance with the teachings of the present invention was made using the formulation indicated below.

| Material | Weight (g) |
| --- | --- |
| Water | 296.1 |
| 2-(4-Thiazolyl)benzimidizole (antimicrobial agent) | 0.26 |
| Pre-Mixed Slurry | 70.8 |
| Polyvinylpyrrolidone (PVP) K 90 | 80.5 |
| Polyvinylpyrrolidone (PVP) K 30 | 8.9 |
| Sodium stearate | 43.4 |
| Pre-Mixed Slurry | |
| Water | 6.58 g |
| Sodium Hydroxide | 0.922 g |
| TEA | 52.6 g |
| Phenolphthalein | 0.988 g |
| Secondary phthalein (used to darken color) | 0.016 g |
| Polyethylene oxide (lubricant) | 9.2 g |
| Methyl para-hydroxybenzoate (antimicrobial agent) | 0.12 g |
| Propyl para-hydroxybenzoate (antimicrobial agent) | 0.12 g |

The Pre-Mixed Slurry was prepared by slurrying together the ingredients listed above at room temperature (these ingredients being combined in the order they are listed from top to bottom).

Instructions for Preparation (for the Adhesive Composition)

1. At room temperature, 2-(4-Thiazolyl)benzimidizole was added to water.
2. The Pre-Mixed Slurry was then added to the mixture obtained in Step 1.
3. PVP K 90 and PVP K 30, in that order, were then slurried into the mixture obtained in Step 2.
4. The mixture obtained in Step 3 was then raised in temperature to about 185° F. At this elevated temperature, sodium stearate was then slurried into the mixture.
5. The following viscosity measurements were then performed on the composition obtained in Step 4 using a Brookfield Viscometer (185° F., Spindle #28, Thermosel RV). RPM Viscometer Reading Average Viscosity for 3 readings

| RPM | Viscometer Reading | Average Viscosity for 3 readings |
| --- | --- | --- |
| 2 | 5.5 | 14,000 cps |
|  | 5.6 |  |
|  | 5.7 |  |
| 4 | 10.3 | 12,916 cps |
|  | 10.3 |  |
|  | 10.4 |  |
| 10 | 22.9 | 11,466 cps |
|  | 22.9 |  |
|  | 23 |  |
| 20 | 40.2 | 8,053 cps |
|  | 40.3 |  |
|  | 40.3 |  |

6. The composition obtained in Step 4 was then poured into a reclosable tube dispenser and allowed to cool to room temperature.

7. After cooling for a minimum of 24 hours, the hardness of the composition was then tested by taking 3 readings from a penetrometer. The average reading was 24, with a minimum reading of 23.2 and a maximum reading of 24.6.

EXAMPLE 2

A second adhesive composition in accordance with the teachings of the present invention was made using the formulation indicated below.

| Material | Weight (g) |
| --- | --- |
| Water | 241.1 |
| 2-(4-Thiazolyl)benzimidizole (antimicrobial agent) | 0.21 |
| Pre-Mixed Slurry | 55.4 |
| Polyvinylpyrrolidone (PVP) K 90 | 41.9 |
| Polyvinylpyrrolidone (PVP) K 30 | 27.9 |
| Sodium stearate | 33.9 |
| Pre-Mixed Slurry | |
| Water | 5.13 g |
| Sodium Hydroxide | 1.02 g |
| TEA | 41.0 g |
| Phenolphthalein | 0.750 g |
| Secondary phthalein (used to darken color) | 0.013 g |
| Polyethylene oxide (lubricant) | 7.182 g |
| Methyl para-hydroxybenzoate (antimicrobial agent) | 0.102 g |
| Propyl para-hydroxybenzoate (antimicrobial agent) | 0.102 g |

The Pre-Mixed Slurry was prepared by slurrying together the ingredients listed above at room temperature (these ingredients being combined in the order they are listed from top to bottom).

Instructions for Preparation (for the Adhesive Composition)

1. At room temperature, 2-(4-Thiazolyl)benzimidizole was added to water.
2. The Pre-Mixed Slurry was then added to the mixture obtained in Step 1.
3. PVP K 90 and PVP K 30, in that order, were then slurried into the mixture obtained in Step 2.
4. The mixture obtained in Step 3 was then raised in temperature to about 185° F. At this elevated temperature, sodium stearate was then slurried into the mixture.
5. The following viscosity measurements were then performed on the composition obtained in Step 4 using a Brookfield Viscometer (185° F., Spindle #28, Thermosel RV).

| RPM | Viscometer Reading | Average Viscosity for 3 readings |
| --- | --- | --- |
| 2 | 2 | 5,000 cps |
|  | 2 |  |
|  | 2 |  |
| 4 | 3.9 | 4,875 cps |
|  | 3.9 |  |
|  | 3.9 |  |
| 10 | 24.1 | 4,416.7 cps |
|  | 24.2 |  |
|  | 24.2 |  |
| 20 | 16.5 | 4,133 cps |
|  | 16.5 |  |
|  | 16.5 |  |

6. The composition obtained in Step 4 was then poured into a reclosable tube dispenser and allowed to cool to room temperature.

7. After cooling for a minimum of 24 hours, the hardness of the composition was then tested by taking 3 readings from a penetrometer. The average reading was 35.5, with a minimum reading of 32 and a maximum reading of 38.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An adhesive composition which undergoes a change from colored to colorless upon application to a substrate, said adhesive composition comprising:

(a) a shape-giving base, said shape-giving base comprising a gel of a gel-forming salt of an aliphatic carboxylic acid having from about 8 to 36 carbon atoms with a cation selected from the group consisting of alkali metals, ammonia and lower alkylamines in an aqueous liquid selected from the group consisting of water and mixtures of water with water-miscible organic solvents;

(b) an adhesive component selected from the group consisting of water-soluble and water dispersible adhesives;

(c) a colored indicator which upon exposure to air becomes colorless, said colored indicator being a phthalein; and (d) triethanolamine.

2. The adhesive composition as claimed in claim 1 wherein said adhesive component is polyvinylpyrrolidone.

3. The adhesive composition as claimed in claim 1 wherein said gel-forming salt of an aliphatic carboxylic acid is sodium stearate.

4. The adhesive composition as claimed in claim 1 wherein said colored indicator is phenolphthalein.

5. The adhesive composition as claimed in claim 2 wherein said colored indicator is phenolphthalein.

6. The adhesive composition as claimed in claim 3 wherein said colored indicator is phenolphthalein.

7. The adhesive composition as claimed in claim 6 wherein said adhesive component is polyvinylpyrrolidone.

8. The adhesive composition as claimed in claim 1 further comprising an antimicrobial agent.

9. The adhesive composition as claimed in claim 1 further comprising a lubricant.

10. The adhesive composition as claimed in claim 1 wherein triethanolamine is present in an amount up to about 20% by weight of said adhesive composition.

11. The adhesive composition as claimed in claim 1 wherein triethanolamine is present in an amount of approximately 5%–12% by weight of said adhesive composition.

12. An adhesive composition which undergoes a change from colored to colorless upon application to a substrate, said adhesive composition comprising:

(a) approximately 2%–30% by weight of a gel-forming salt of an aliphatic carboxylic acid having from about 8 to 36 carbon atoms with a cation selected from the group consisting of alkali metals, ammonia and lower alkylamines;

(b) approximately 25%–80% by weight of water;

(c) approximately 5%–40% by weight of an adhesive component, said adhesive component being selected from the group consisting of water-soluble and water dispersible adhesives;

(d) approximately 0.1–2.5% by weight of a colored indicator which upon exposure to air becomes colorless, said colored indicator being a phthalein; and (e) approximately 5%–20% by weight of triethanolamine.

13. The adhesive composition as claimed in claim 12 wherein said colored indicator is present in an amount of approximately 0.1%–0.25% by weight of said adhesive composition.

14. The adhesive composition as claimed in claim 12 wherein said colored indicator is phenolphthalein.

15. The adhesive composition as claimed in claim 12 wherein triethanolamine is present in an amount of approximately 5%–12% by weight of said adhesive composition.

16. The adhesive composition as claimed in claim 12 wherein said gel-forming salt of an aliphatic carboxylic acid is sodium stearate and wherein said adhesive component is polyvinylpyrrolidone.

17. The adhesive composition as claimed in claim 12 further comprising a lubricant, one or more antimicrobial agents and a second colorant.

18. The adhesive composition as claimed in claim 17 wherein said second colorant is a phthalein, said second colorant and said colored indicator not being identical.

19. The adhesive composition as claimed in claim 18 wherein said colored indicator is phenolphthalein.

20. An adhesive composition which undergoes a change from colored to colorless upon application to a substrate, said adhesive composition comprising:

(a) a shape-giving base;

(b) an adhesive component;

(c) a colored indicator which upon exposure to air becomes colorless; and (d) an aminoalcohol present in an amount ranging from about 5% to about 20%, by weight, of the total adhesive composition to prevent said colored indicator from fading in color during storage and from drying brown when applied to a substrate wherein said aminoalcohol is triethanolamine.

* * * * *